(12) United States Patent
Wu et al.

(10) Patent No.: US 9,020,618 B2
(45) Date of Patent: Apr. 28, 2015

(54) ACCELEROMETER BASED CONTROLLER AND/OR CONTROLLED DEVICE

(75) Inventors: Xin Wu, Chongqing (CN); Liang Gao, Chongqing (CN); Kewan Chen, Chongqing (CN)

(73) Assignee: Empire Technology Development LLC, Wilmington, DE (US)

( * ) Notice: Subject to any disclaimer, the term of this patent is extended or adjusted under 35 U.S.C. 154(b) by 1046 days.

(21) Appl. No.: 13/119,896

(22) PCT Filed: Apr. 26, 2010

(86) PCT No.: PCT/CN2010/072189
§ 371 (c)(1),
(2), (4) Date: Mar. 18, 2011

(87) PCT Pub. No.: WO2011/134135
PCT Pub. Date: Nov. 3, 2011

(65) Prior Publication Data
US 2011/0264272 A1      Oct. 27, 2011

(51) Int. Cl.
G05B 11/32      (2006.01)
G05D 3/12       (2006.01)
A47L 1/02       (2006.01)
A47L 9/28       (2006.01)
G06F 3/0346     (2013.01)

(52) U.S. Cl.
CPC ... *G05D 3/12* (2013.01); *A47L 1/02* (2013.01); *A47L 9/2805* (2013.01); *A47L 9/2842* (2013.01); *A47L 9/2852* (2013.01); *A47L 9/2894* (2013.01); *G06F 3/0346* (2013.01)

(58) Field of Classification Search
USPC ............ 700/60, 63, 69, 74, 304, 65–66
See application file for complete search history.

(56) References Cited

U.S. PATENT DOCUMENTS

| | | | |
|---|---|---|---|
| 5,699,576 A | 12/1997 | Sohaiby | |
| 5,819,206 A | 10/1998 | Horton et al. | |
| 6,988,290 B2 * | 1/2006 | Enoch et al. | 15/103 |
| 7,503,091 B2 | 3/2009 | White et al. | |
| 2006/0048800 A1 | 3/2006 | Rast | |
| 2007/0278023 A1 * | 12/2007 | Masut et al. | 180/65.5 |

FOREIGN PATENT DOCUMENTS

| | | |
|---|---|---|
| CN | 201005622 | 1/2008 |
| CN | 201097327 | 8/2008 |
| CN | 101655737 | 2/2010 |
| JP | 10066663 | 3/1998 |

OTHER PUBLICATIONS

PCT Application No: PCT/CN2010/072189 International Search Report, filing date: Apr. 26, 2010, mailing date: Jan. 20, 2011, 13 pages.

* cited by examiner

*Primary Examiner* — Mohammad Ali
*Assistant Examiner* — Nathan Laughlin
(74) *Attorney, Agent, or Firm* — Dorsey & Whitney LLP (57) ABSTRACT

The present disclosure generally relates to techniques for controlling a device to perform a function, for example, window washing. A controller device may be adapted to control a controlled device. In response to hand movement, an accelerometer in the controller may obtain acceleration and/or angle signals. The signals may be processed in order to identify a command that may be used to control the controlled device. The controlled device may be secured to, for example, a window. Upon identifying command(s) initiated from the controller device, the controlled device may respond to the commands. The controlled device may include, for example, a cleaning unit. The command(s) may be instructions for the controlled device to move about the window and activate the cleaning system.

21 Claims, 4 Drawing Sheets

ACCELEROMETER BASED CONTROLLER AND/OR CONTROLLED DEVICE

CROSS-REFERENCE TO RELATED APPLICATIONS

This application is the National Stage filing under 35 USC §371 of International Application No. PCT/CN2010/072189, filed Apr. 26, 2010, the disclosure of which is incorporated herein by reference.

BACKGROUND

Using conventional methods for cleaning windows involves a user grasping a cleaning rag and scrubbing window panes. Contact between the cleaning rag, held by the user's hand, and the window is needed at all times. However, if the window is high above ground, it is dangerous for a user to access the outside of the window and clean it properly.

There are two-sided window cleaners that involve cleaning both sides of a window at the same time. However, such products still require a user to maintain contact with at least one side of the two-sided window cleaning system.

SUMMARY

Techniques are generally described in the present disclosure for an apparatus including an accelerometer configured to determine at least two (i.e. two or more) acceleration values based on a movement of the apparatus. A processor may be configured to determine a trajectory based on the two or more acceleration values, and a transmitter may be configured to transmit the determined trajectory to a controlled device.

The processor may further be configured to identify a command for controlling at least one motor based on the determined trajectory.

The apparatus may further include a second accelerometer that may be configured to determine at least two additional (i.e., two or more) acceleration values based on the movement of the apparatus, wherein the processor may be further configured to determine the trajectory based on the two or more acceleration values determined by the second accelerometer and the two or more additional acceleration values determined by the accelerometer.

The apparatus may be implemented as a controller configured to remotely control a window washing type of controlled device.

An apparatus adapted to be controlled by a device that includes an accelerometer is also described in the present disclosure, where the apparatus may include a receiver configured to receive information from the device including the accelerometer; a processor configured to identify a command for controlling the apparatus based on the received information; and a controller configured to control one or more motors in the apparatus based on the identified command.

The received information may include acceleration values associated with the accelerometer, and the processor may be further configured to determine at least one trajectory value (i.e., one or more trajectory values) based on the acceleration values. The command may be identified based, at least in part, on the determined at least one trajectory value.

The apparatus may further include one or more motors configured to move the apparatus in response to one or more signals from the controller based on the identified command.

The apparatus may further include at least one magnet structure configured to interact with a second magnet structure.

The apparatus may further include a cleaning unit configured to remotely clean a surface adjacent to the apparatus based at least in part on the movement of the controller.

One magnet structure may be coupled to the controlled device and adapted to interact with a second magnet structure that is external to the controlled device such that the apparatus may be secured to a surface.

A method for controlling a controlled device with a controller that includes an accelerometer is also described in the present disclosure, where the method may include determining at least two (i.e., two or more) acceleration values based on a movement the controller; determining a trajectory of the controller based on the at least two acceleration values; and transmitting the determined trajectory to the controlled device, wherein the controlled device is responsive to the movement of the controller.

The method may further include identifying a command to control at least one motor in the controlled device based on the determined trajectory.

The method may further include determining at least two additional (i.e., two or more) acceleration values based on the movement of the controller, wherein determining the trajectory of the controller is based, at least in part, on the at least two acceleration values and the at least two additional acceleration values.

The method may be adapted to control a window washing type of controlled device that is remotely controlled by movement of the controller.

Another method for a controlled device that is controlled by a controller that includes an accelerometer is also generally described in the present disclosure, where the method may include receiving information from the controller; identifying a command to control the controlled device based at least in part on the received information; and controlling at least one motor in the controlled device based on the identified command.

The received information may include acceleration values of the accelerometer, and wherein the at least one trajectory value may be determined based on the acceleration values.

The command may be identified based on the identified at least one trajectory value.

The method may further include actuating a motor in the controlled device based on the identified command.

The method may further include remotely cleaning a surface adjacent to the apparatus in response to the movement of the controlled device.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following descrip

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatuses, computer programs and systems related to controlling a device to perform a function, for example, window washing. A controller device that may be used in conjunction with a user's hand, for example, installed on the back of a user's hand, may be used to control a controlled device. In response to hand movement, at least two bi-axis accelerometers in the controller obtains acceleration and angle signals. The signals may be processed in order to identify a command acceleration that may be used to control the controlled device.

The present disclosure generally relates to techniques for controlling a device to perform a function, for example, window washing. A controller device may be adapted to control a controlled device. In response to hand movement, an accelerometer in the controller may obtain acceleration and/or angle signals. The signals may be processed in order to identify a trajectory of the hand movement. The trajectory is converted to a digital signal to be transmitted to a controlled device as a command that may be used to control the controlled device. The controlled device may be secured to, for example, a window. Upon identifying command(s) initiated from the controller device, the controlled device may respond to the commands. The controlled device may include, for example, a cleaning unit. The command(s) may be instructions for the controlled device to move about the window and activate the cleaning system.

Figure 1:
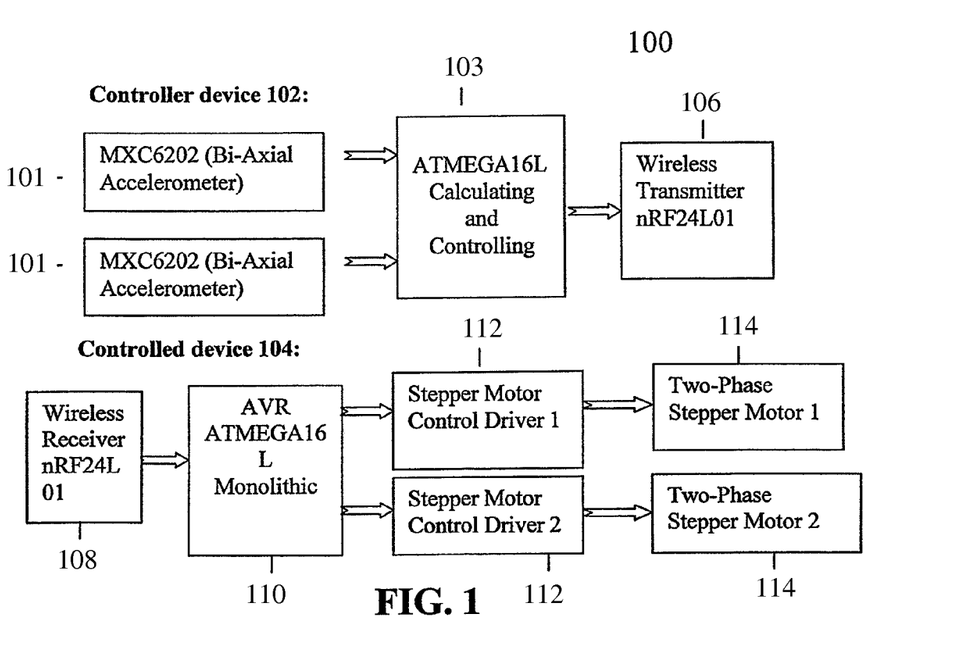
- FIG. 1 is a block diagram illustrating a system including a controller device and a controlled device.

FIG. 1 is a block diagram illustrating an example system 100 including a controller device 102 and a controlled device 104, arranged in accordance with at least some embodiments of the present disclosure. Controller device 102 and controlled device 104 in FIG. 1 depict a specific example of the components included in controller device 102 and controlled device 104. Example system 100 may be arranged to, upon movement of the controller device 102, determine acceleration and/or angle signals, determine one or more trajectory values based on the determined acceleration and/or angle signals, identify one or more commands based on the determined acceleration and/or angle signals and/or trajectory values, and/or execute the one or more identified commands at the controlled device 104.

In some examples, controller 102 may be implemented as a device that may be affixed to a user's hand, held in the palm of the user's hand, etc.

Figure 2:
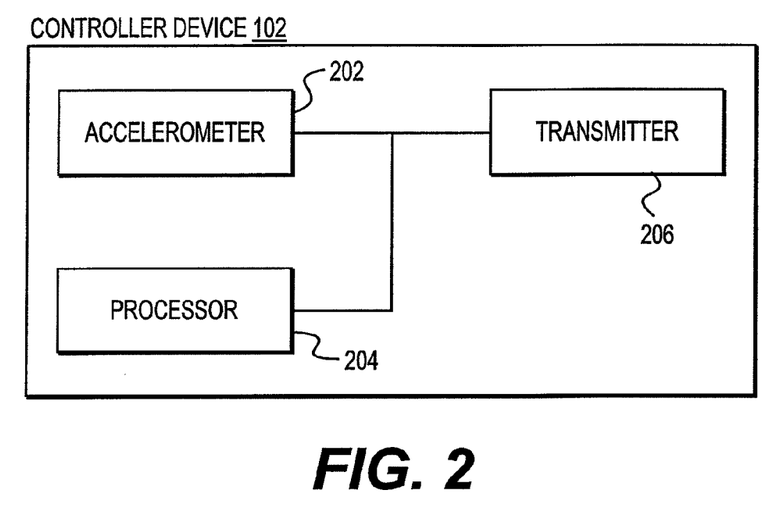
FIG. 2 is a block diagram illustrating an example of a configuration of a controller device.

FIG. 2 is a block diagram illustrating an example of a configuration of a controller device 102, arranged in accordance with at least some embodiments of the present disclosure. As shown in FIG. 2, controller device 102 may include one or more of an accelerometer 202, a processor 204, and/or a transmitter 206.

Accelerometer 202 may be implemented as a MEMS accelerometer, for example, non-gyroscopic, MXC6202 (bi-axial accelerometer) manufactured by Memsic, Inc. (as shown as accelerometer 101 in FIG. 1). It may be appreciated that more than one accelerometer may be provided in controller device 102. For example, two or more accelerometers may be provided in controller device 102. It may further be appreciated by one skilled in the art that other accelerometers may be implemented as accelerometer 202, provided that the functionality as discussed herein may be achieved.

Processor 204 may be implemented as, for example, ATMEGA16L processor manufactured by Atmel Corporation (as shown as ATMEGA16L Calculating and Controlling 103 in FIG. 1). It may further be appreciated by one skilled in the art that other processors may be implemented as processor 104, provided that the functionality as discussed herein may be achieved.

Transmitter 206 may be implemented as, for example, a wireless transmitter. For example, transmitter 206 may be implemented as RF24L01 manufactured by Nordic Semiconductor ASA (as shown as wireless transmitter 106 in FIG. 1). It may further be appreciated by one skilled in the art that other transmitters may be implemented as transmitter 206, provided that the functionality as discussed herein may be achieved.

It may be appreciated that the controller device 102 may further incorporate one or more actuatable buttons (not shown). Where a user may actuate one or more of the buttons provided in the controller device, a command may be generated and transmitted to the controlled device 104 such that the controlled device 104 may execute the command.

The controller device 102 may be operated by a user based on gestures the user makes while the controlled device 104 (See FIG. 1) is installed, held, etc. The gestures may be interpreted as commands as discussed herein in order to control the controlled device. Alternatively, the controller device may be operated by a user based on a combination of gestures and/or button pressing operations.

Figure 3:
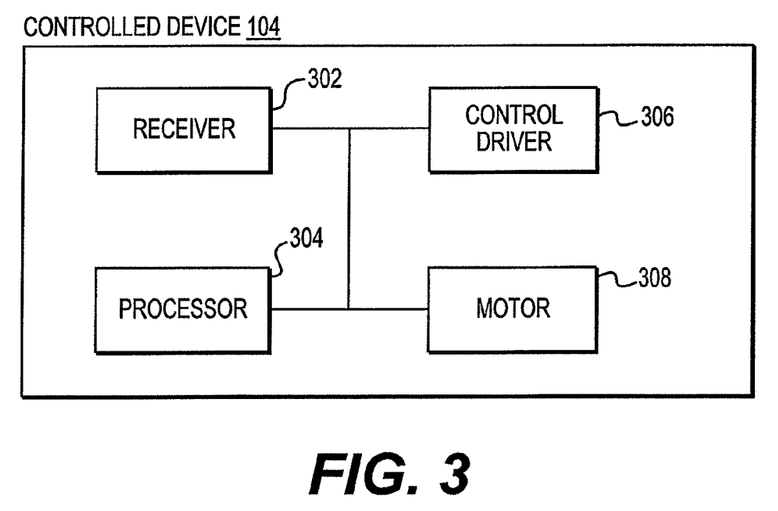
FIG. 3 is a block diagram illustrating an example of a configuration of a controlled device.

FIG. 3 is a block diagram illustrating an example of a configuration of a controlled device 104, arranged in accordance with at least some embodiments of the present disclosure. As shown in FIG. 3, controlled device 104 may include one or more of a receiver 302, a processor 304, a control driver 306, and/or a motor 308.

Receiver 302 may be implemented as, for example, a wireless receiver. For example, receiver 302 may be implemented as RF24L01 manufactured by Nordic Semiconductor ASA (as shown as wireless receiver 108 in FIG. 1). It may further be appreciated by one skilled in the art that other receivers may be implemented as receiver 302, provided that the functionality as discussed herein may be achieved.

Processor 304 may be implemented as, for example, ATMEGA16L processor manufactured by Atmel Corporation (as shown as AVR ATMEGA 16L monolithic 110 in FIG. 1). It may further be appreciated by one skilled in the art that other processors may be implemented as processor 104, provided that the functionality as discussed herein may be achieved. Processor 304 may be configured to receive data from receiver 304. Data may include acceleration and/or angle signals that were generated by accelerometer 202 (See FIG. 2). The processor may be configured to process the data, as discussed herein, in order to identify one or more trajectory values based on the acceleration and/or angle signals and to generate, identify, determine, calculate, etc., one or more commands that may be used to operate controlled device 104 through one or more motors 308.

Control driver 306 may be implemented as, for example, a stepper motor control driver (as shown as stepper motor control driver 1 112 and/or stepper motor control driver 2 in FIG. 1). It may be appreciated that controlled device 104 may include more than one control driver 306 depending on how many motors 308 are incorporated in controlled device 104. Control driver 306 may be arranged to communicate with processor 304 in order to receive commands and control one or more motors 308 responsive to the received commends.

Motor 308 may be implemented as, for example, a two-phase stepper motor (as shown as two-phase stepper motor 1 114 and/or two-phase stepper motor 2 114 in FIG. 1). It may further be appreciated that more than one motor may be provided in controlled device 104. If more than one motor is provided, more than one control driver may be provided in order to control the additional motor. Motor 308 may operate based on control(s) received from control driver 306.

Controlled device 104 may further include component(s) (not shown) connected to the motor in order to facilitate movement of the controlled device. For example, controlled device 104 may include one or more wheels 502 connected to motor 308 (504 in FIG. 5). Upon receiving commands from control device 306, motor 308 (504 in FIG. 5) may be configured to turn the wheel(s) 502 in order to move the controlled device from one location to another location. It may be appreciated that instead, or in addition, the controlled device 104 may include, for example, track(s), a tread(s), slider(s), etc. that may be coupled to the motor and adapted to facilitate movement of controlled device 104.

Controlled device 104 may further include a magnet structure (not shown) that may be affixed to the controlled device 104. The magnet structure may include, for example, a two-sided Nd—Fe—B magnet structure configured to adhere the controlled device 104 to one side of a window while interacting with another device on the other side of the window. The device on the other side of the window may include a magnet attached to, for example, a four-wheel plane. As the controlled device 104 moves on one side of the window, the magnet on the controlled device may be configured to attract the magnet on the device of the other side of the window. Due to the attraction between the two magnets positioned on both sides of the window, the controlled device does not fall off the window and moves smoothly over the surface of the window. Based on the attraction between the two magnets, the controlled device 104 and the device on the other side of the window have similar trajectories. It may be appreciated by one skilled in the art that the size of the magnets may be selected based on the structure and weight of the controlled device. The size of the magnets should be selected such that the magnetic force between the magnets is strong enough so that the controlled device and the device on the other side of the window are secure to the window surface. It may further be appreciated that lead sheets may be used to adjust the magnetic force between magnets.

Controlled device 104 may further include additional components depending on its functionality. For example, where the controlled device 104 is being implemented as a window washing controlled device, controlled device 104 may further include a cleaning unit that may include tools for cleaning windows (not shown).

For example, the controlled device may include a squeegee and a sponge configured so as to wipe the window with the sponge and then to squeegee the window to dry it. Alternatively, In addition, the controlled device may include one or more fluid chambers configured to hold fluid and release the fluid upon receiving a command. Such a command may be generated in the same way as a command to drive a motor as discussed above. The controlled device may further include one or more additional actuators adapted to open and close the fluid chamber(s) in order to release fluid.

Controller Operation

Figure 4:
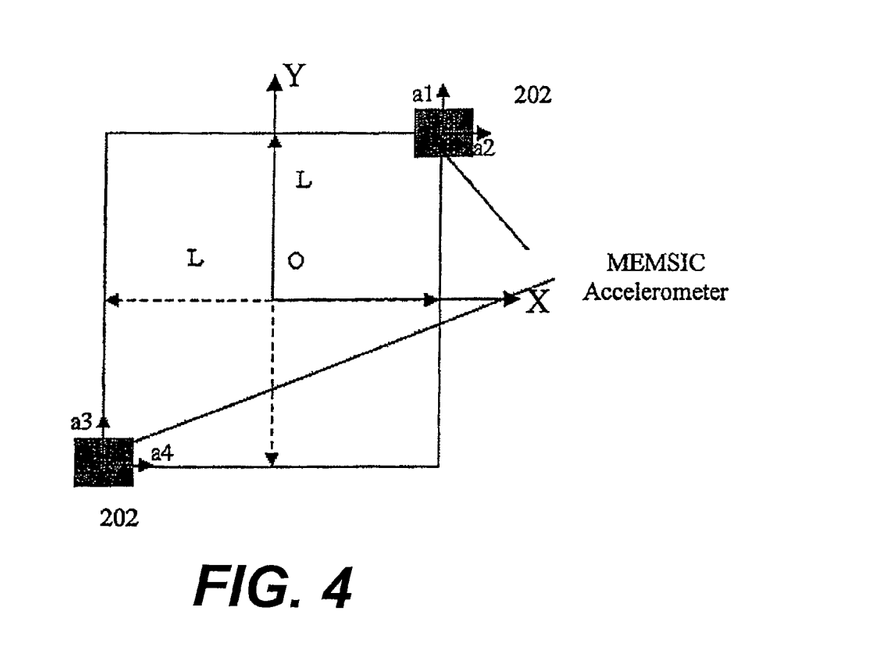
FIG. 4 illustrates the carrier coordinate in a control device and the position of two accelerometers.

FIG. 4 illustrates the positioning of two accelerometers in a controller device in accordance with at least some embodiments of the present disclosure. In this example, the controlled device includes two accelerometers 202. Two bi-axial accelerometers may be positioned on the hand as shown in FIG. 4. The distance between the two accelerometers, in one example, are 5 cm in both horizontal and vertical directions, (e.g., L=2.5 cm=0.025 m). In the rectangular coordinate system XOY, Point O is the origin of the controller carrier coordinate, a1 and a2 are Y-axial and X-axial output values of the accelerometer MXC6202, respectively, and a3 and a4 are Y-axial and X-axial output values of the other accelerometer, respectively. In this example, the hand is defined as the carrier coordinate system, and the Earth as the inertia coordinate system.

The measured values of a1, a2, a3, a4 are in the carrier coordinate system. The acceleration values in the inertia system may be calculated as follows:

($\omega'=(\omega_x \omega_y \omega_z)'$ is the angular acceleration of the controller, $P=(a_x\ a_y\ a_z)'$ is the linear acceleration of the controller, and $a_x$, $a_y$, and $a_z$ are linear accelerations of the controller along x, y, and z axes.)

$$\begin{bmatrix} \omega' \\ P \end{bmatrix} = \begin{bmatrix} 0 \\ 0 \\ 10(a1 - a2 - a3 + a4) \\ 0.5(a2 + a4) \\ 0.5(a1 + a3) \\ 0 \end{bmatrix} \quad (1.1)$$

$$\omega'_z = 10(a1 - a2 - a3 + a4) \quad (1.2)$$
$$a_x = 0.5(a2 + a4)$$
$$a_y = 0.5(a1 + a3)$$

Rotation angles in the inertia system may be obtained by integration, achieving acceleration and angle measurement in the inertia system.

Processor 204 may be adapted to gather the sensor signals (e.g., from accelerometer 204), compute the data (e.g., position, acceleration, etc.) from the gathered sensor signals, and/or transmit the data as one or more signals through the transmitter 206.

Controlled Device

Figure 5:
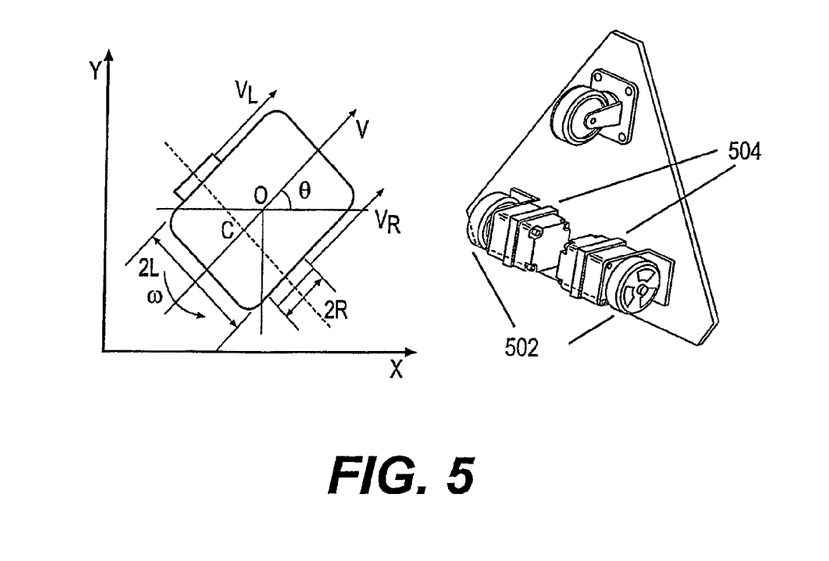
FIG. 5 illustrates an example of a controlled device; all arranged in accordance with at least some embodiments of the present disclosure.

FIG. 5 illustrates an example of a controlled device arranged in accordance with at least some embodiments of the present disclosure. As shown in FIG. 5, a device may be positioned about origin O, with a rotational angle θ with respect to X and Y axes. The rotational movement about the origin O may be indicated by the angular acceleration ω about the origin O. The system may be adapted to determine the system position and orientation by the following formula. In FIG. 5, Point O is the geometrical center of the moving robot; Point C is the center of the axles of two driving wheels; the wheel radius is R; the length between centers of the two driving wheels is 2L. In Cartesian coordinate system, assuming Point C as a reference point, Coordinate (x, y) herein represents the coordinate of Point C; θ is the attitude angle of the robot, i.e. the azimuth angle of the forward direction of the robot with respect to X-axis; v is the forward velocity of the robot; ω is the rotational velocity of the robot body; $V_L$ and $V_R$ are linear velocities of the left and right wheels of the robot, respectively; $\omega_L$ and $\omega_R$ are rotational velocities of the left and right wheels of the robot. And the mass center motion equation is:

$$\begin{bmatrix} \dot{x} \\ \dot{y} \\ \dot{\theta} \end{bmatrix} = \begin{bmatrix} \frac{R}{2}\cos\theta & \frac{R}{2}\cos\theta \\ \frac{R}{2}\sin\theta & \frac{R}{2}\sin\theta \\ -\frac{R}{2L} & \frac{R}{2L} \end{bmatrix} \begin{bmatrix} \omega_L \\ \omega_R \end{bmatrix} \quad (2.1)$$

As shown by equation (2.1), if $\omega_L$ and $\omega_R$ are known, then the position and orientation of the execution structure may be determined. The relationship between the motor speed and angular speed may be determined as: ω=(2πn)/60. (n is the rotational speed of the stepper motor) Thus, $\omega_L$ and $\omega_R$ may be determined from motor speed. Therefore, the control of the rotational and linear motion for the execution structure may be achieved.

Figure 6:
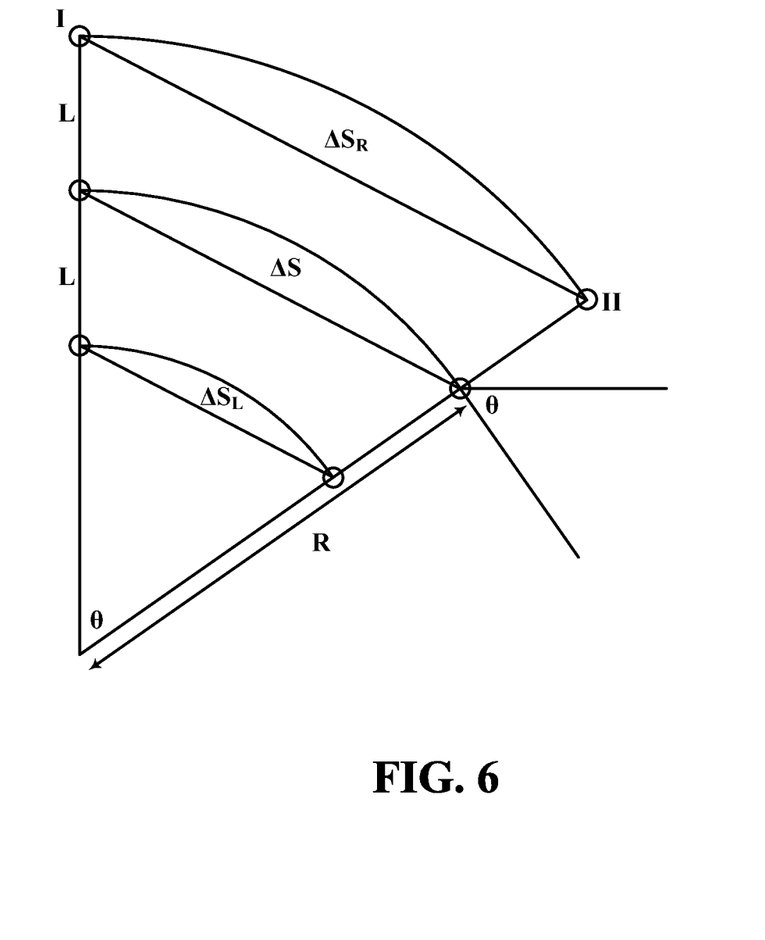
FIG. 6 illustrates an example of a control model; all arranged in accordance with at least some embodiments of the present disclosure.

According to the equation (2.1), and as illustrated in FIG. 6, a control model may be established as follows.

Assuming the movement of the rear end of the device represents the movement of the center of gravity, as with the small circle on the chart, in a very short time period T, the path of the very small circle may be approximated by using the dashed line ΔS in the middle. $ΔS_R$ and $ΔS_L$ are the paths of the execution system's right and left wheels. Given V as the approximate average velocity in time T, then $ΔS=VT$ $ΔS=R*θ=VT$ where $R=VT/θ$ then $ΔS_R(R-L)*θ=VT-Lθ$ (2.2)

$ΔS_L=(R+L)*θ=VT+Lθ$ (2.3)

From equations (2.2) and (2.3) one can conclude the following:

(1) The motion of the execution system is controlled by the paths of the left and right wheels according to (2.2) and (2.3). The path of the execution system is controlled.

(2) The path of the wheel is controlled by the motor speed. Assume the wheel radius is r, $ΔS_R=N_L T*2πr=VT=Lθ$ $ΔS_L=N_R T*2πr=VT+Lθ$ when T is very short, $V(V_n)$ can be approximated by: $V_n=V_{n-1}±aT/2$.

Based on the signals $a_x$, $a_y$, and θ from the control system, the required control signal a and θ may obtained:

$a^2=a_x^2+a_y^2$;

$θ=θ$;

The wheel rotational speed $N_L$, $N_R$ are calculated from Vn $$V_n = V_{n-1} \pm \frac{\sqrt{a_x^2 + a_y^2}}{2} T \quad (2.4)$$

Where $V_{n-1}$ is the average velocity in last time period T.

$$N_R = \frac{V_n T - L\theta}{2\pi r * T} \quad (2.5)$$

$$N_L = \frac{V_n T + L\theta}{2\pi r * T} \quad (2.6)$$

Equations (2.5) and (2.6) are used as motor control speed.

This system including the controller device 102 and controlled device 104 enables a user to perform functionality, for example, cleaning windows, not only in commercial establishments, but in a residential home.

The system as described herein may be utilized to reduce the danger encountered by working at high altitude. There is great difficulty and inconvenience involved in working high above the ground. The use of a wireless control system may eliminate such a disadvantage.

The system is easy and simple to operate. For example, the user may carry on the operation even when sitting on a chair or sofa. Based on a user's gesture, the user may effectively generate commands to operate a controlled device.

The system may incorporate a high performance-to-price ratio. This system may suit family uses, is inexpensive and has broad market prospects.

The system may be adapted for ease of operation and widespread application. In some example systems, the user only needs to operate switch(es) and/or wave his or her hand to clean the windows.

The components incorporated in the system as described herein may be implemented in an inexpensive and durable manner.

The system as discussed herein may be adaptable for multiple applications. The wireless window cleaning system may be applied not only to windows, but also to cleaning floors, tables, chairs, and other furniture.

There is little distinction left between hardware and software implementations of aspects of systems; the use of hardware or software is generally (but not always, in that in certain contexts the choice between hardware and software can become significant) a design choice representing cost vs.

efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus adapted to be attached to a window to clean a surface of the window and to be controlled by a handheld controller device that is detached from the apparatus and that includes an accelerometer, wherein the controller device is configured to transmit trajectory values which are based on acceleration values determined by the accelerometer in response to movement of the handheld controller device, wherein the trajectory values are indicative of an angular acceleration of the controller device about an axis, a first linear acceleration of the controller device in a first direction, and a second linear acceleration of the controller device in a second direction, the apparatus comprising:
   a receiver configured to receive the trajectory values from the controller device;
   a processor configured to generate a first motor control signal and a second motor control signal for controlling the apparatus based on the received trajectory values;
   a first motor operatively connected to a first wheel;
   a second motor operatively connected to a second wheel;
   a controller configured to control the first motor based on the first motor control signal and to control the second motor based on the second motor control signal, wherein control of the first motor and the second motor results in movements of first and second wheels such that movements of the apparatus correspond to movements of the controller device about the axis, in the first direction, and in the second direction; and
   a cleaning unit including one or more cleaning tools configured to clean the surface of the window responsive to movement of the controller.

2. The apparatus of claim 1, wherein the processor is further configured to identify a command based on the received trajectory values.

3. The apparatus of claim 2, wherein the processor is further configured to generate the first motor signal and the second motor signal based on the identified command.

4. The apparatus of claim 1, further comprising:
   at least one magnet structure is configured to interact with a second magnet structure.

5. The apparatus of claim 1, further comprising at least one magnet structure coupled to the apparatus, wherein the at least one magnet structure is arranged to interact with a second magnet structure that is external to the apparatus to secure the apparatus to a surface.

6. A method for controlling a controlled device, which is configured to clean a surface adjacent thereto, by a handheld controller device that is detached from the controlled device and that includes an accelerometer, wherein the controller device is configured to transmit trajectory values which are based on acceleration values determined by the accelerometer, the method comprising:
   receiving trajectory values from the controller device, wherein the trajectory values are indicative of an angular acceleration of the controller device about an axis, a first linear acceleration of the controller device in a first direction, and a second linear acceleration of the controller device in a second direction;
   generating, by the controlled device, a first motor control signal and a second motor control signal based at least in part on the received trajectory values; and
   moving the controlled device relative to the surface by controlling a first motor in the controlled device based on the first motor control signal and controlling a second motor in the controlled device based on the second motor control signal, wherein the first motor is operatively connected to a first wheel and the second wheel is operatively connected to a second wheel, and wherein controlling the first motor and the second motor results in movements of first and second wheels such that movements of the apparatus correspond to movements of the controller device about the axis, in the first direction, and in the second directions, thereby cleaning the surface.

7. The method of claim 6, wherein the received trajectory values include acceleration values of the accelerometer.

8. The method of claim 6, further comprising:
   identifying a command based on the received trajectory values.

9. The method of claim 6, further comprising attaching the controlled device to a window.

10. The method of claim 9, wherein attaching the controlled device to the window includes magnetically attaching the controlled device on a first side of the window to another device on a second, opposite side of the window.

11. A system for cleaning a window, the system comprising:
   a handheld controller device comprising:
      an accelerometer configured to determine two or more acceleration values based on a movement of the controller device,
      a first processor configured to determine trajectory values based on the two or more acceleration values, wherein the trajectory values are indicative of an angular acceleration about an axis, a first linear acceleration in a first direction, and a second linear acceleration in a second direction, wherein the axis, the first direction, and the second direction are all orthogonal with respect to each other, and
      a transmitter configured to transmit the trajectory values; and
   a controlled device detached from the handheld controller device, the controlled device comprising:
      a receiver configured to receive the trajectory values transmitted by the transmitter of the controller device,
      a second processor configured to generate a first motor control signal and a second motor control signal for controlling the apparatus based on the received trajectory values,
      a first motor operatively connected to a first wheel,
      a second motor operatively connected to a second wheel,
      a controller configured to control the first motor based on the first motor control signal and to control the second motor based on the second motor control signal, wherein control of the first motor and the second motor results in movements of first and second wheels such that movements of the apparatus correspond to movements of the controller device about the axis, in the first direction, and in the second direction; and
a cleaning unit including one or more cleaning tools configured to clean a surface of the window responsive to movement of the controller.

12. The system of claim 11, wherein the first processor is further configured to identify a command to control at least one of the first motor and the second motor based on the trajectory values.

13. The system of claim 11, the controller device further comprising:
a second accelerometer configured to determine two or more additional acceleration values based on the movement of the controller device,
wherein the first processor is further configured to determine the trajectory values based on the two or more acceleration values determined by the accelerometer and the two or more additional acceleration values determined by the second accelerometer.

14. The system of claim 13, wherein the two or more acceleration values comprise acceleration values $a_1$ and $a_2$, wherein the two or more additional acceleration values comprise acceleration values $a_3$ and $a_4$, wherein the trajectory values comprise angular acceleration $\omega'_z$, first linear acceleration $a_x$, and second linear acceleration $a_y$, and wherein the first processor is configured to determine the trajectory values according to the formulas:

$$\omega'_z = 10(a_1 - a_2 - a_3 + a_4)$$

$$a_x = 0.5(a_2 + a_4)$$

$$a_y = 0.5(a_1 + a_3).$$

15. The system of claim 11, wherein the controlled device is configured to attach to a window.

16. The system of claim 15, wherein the controlled device includes a magnetic structure configured to secure the controlled device on first side of the window by magnetically attaching to another device on a second, opposite side of the window.

17. A method for controlling a controlled device, which is configured for cleaning a surface adjacent thereto, with a handheld controller device that includes an accelerometer, the method comprising:
moving the handheld controller device independently of the controlled device;
determining, by the controller device, at least two acceleration values based on the movement of the controller device;
determining, by the controller device, trajectory values based on the at least two acceleration values, wherein the trajectory values are indicative of an angular acceleration about an axis, a first linear acceleration in a first direction, and a second linear acceleration in a second direction, wherein the axis, the first direction, and the second direction are all orthogonal with respect to each other;
transmitting the trajectory values from the controller device to the controlled device;
generating, by the controlled device, a first motor control signal and a second motor control signal based at least in part on the trajectory values; and
moving the controlled device relative to the surface by controlling a first motor in the controlled device based on the first motor control signal and controlling a second motor in the controlled device based on the second motor control signal, wherein the first motor is operatively connected to a first wheel and the second wheel is operatively connected to a second wheel, and wherein controlling the first motor and the second motor results in movements of first and second wheels such that movements of the apparatus correspond to movements of the controller device about the axis, in the first direction, and in the second directions, thereby cleaning the surface.

18. The method of claim 17, further comprising:
determining a command to control at least one of the first motor and the second motor based on the trajectory values.

19. The method of claim 17, further comprising:
determining at least two additional acceleration values based on the movement of the controller,
wherein determining the trajectory values is based at least in part on the at least two acceleration values and the at least two additional acceleration values.

20. The method of claim 19, wherein the two or more acceleration values comprise acceleration values $a_1$ and $a_2$, wherein the two or more additional acceleration values comprise acceleration values $a_3$ and $a_4$, and wherein determining the trajectory values comprises determining angular acceleration $\omega'_z$, first linear acceleration $a_x$, and second linear acceleration $a_y$ according to the following formulas:

$$\omega'_z = 10(a_1 - a_2 - a_3 + a_4)$$

$$a_x = 0.5(a_2 + a_4)$$

$$a_y = 0.5(a_1 + a_3).$$

21. The method of claim 17, wherein the controlled device is a window washing device that is remotely controlled by movement of the controller device.

* * * * *

UNITED STATES PATENT AND TRADEMARK OFFICE
CERTIFICATE OF CORRECTION

PATENT NO. : 9,020,618 B2  Page 1 of 1
APPLICATION NO. : 13/119896
DATED : April 28, 2015
INVENTOR(S) : Wu et al.

It is certified that error appears in the above-identified patent and that said Letters Patent is hereby corrected as shown below:

In the Specification

In Column 1, Line 8, delete "§371" and insert -- § 371 --, therefor.

In Column 4, Lines 34-35, delete "processor 104" and insert -- processor 204 --, therefor.

In Column 5, Line 8, delete "processor 104" and insert -- processor 304 --, therefor.

In Column 5, Line 11, delete "receiver 304" and insert -- receiver 302 --, therefor.

In Column 6, Line 64, delete "accelerometer 204)," and insert -- accelerometer 202), --, therefor.

Signed and Sealed this
Twenty-fourth Day of November, 2015

Michelle K. Lee
*Director of the United States Patent and Trademark Office*